United States Patent
Shim et al.

(10) Patent No.: US 9,304,938 B2
(45) Date of Patent: Apr. 5, 2016

(54) STORAGE DEVICE AND DATA TRANSFERRING METHOD THEREOF

(71) Applicant: Samsung Electronics Co., Ltd., Suwon-si, Gyeonggi-do (KR)

(72) Inventors: Hojun Shim, Yongin-si (KR); Eunchan Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 210 days.

(21) Appl. No.: 14/088,837

(22) Filed: Nov. 25, 2013

(65) Prior Publication Data

US 2014/0149706 A1    May 29, 2014

(30) Foreign Application Priority Data

Nov. 26, 2012  (KR) .................. 10-2012-0134590

(51) Int. Cl.
  *G06F 12/02* (2006.01)
  *G06F 12/10* (2006.01)
  *G06F 13/28* (2006.01)

(52) U.S. Cl.
  CPC ............ *G06F 12/1081* (2013.01); *G06F 13/28* (2013.01); *G06F 12/0238* (2013.01); *G06F 2212/1024* (2013.01); *G06F 2212/214* (2013.01); *G06F 2212/7203* (2013.01)

(58) Field of Classification Search
  CPC . G06F 12/1081; G06F 12/0238; G06F 13/28; G06F 2212/1024; G06F 2212/214; G06F 2212/7203
  See application file for complete search history.

(56) References Cited

U.S. PATENT DOCUMENTS

| | | | |
|---|---|---|---|
| 6,581,130 B1 | 6/2003 | Brinkmann, Jr. et al. | |
| 6,691,205 B2 * | 2/2004 | Zilberman | G06F 13/1673 365/185.33 |
| 7,370,133 B2 | 5/2008 | Iyer et al. | |
| 7,457,897 B1 | 11/2008 | Lee et al. | |
| 7,461,194 B2 | 12/2008 | Ohara et al. | |
| 7,502,884 B1 | 3/2009 | Shah et al. | |
| 7,562,176 B2 | 7/2009 | Kloeppner et al. | |
| 7,596,643 B2 * | 9/2009 | Merry, Jr. | G06F 3/061 710/52 |
| 7,613,864 B2 | 11/2009 | Torudbakken et al. | |
| 8,140,739 B2 * | 3/2012 | Langlois | G06F 12/0246 365/158 |
| 8,225,019 B2 | 7/2012 | Asnaashari | |
| 8,489,804 B1 * | 7/2013 | Nguyen | G05F 12/0246 365/185.33 |
| 8,984,208 B2 * | 3/2015 | Lee | G06F 3/061 710/36 |
| 2006/0161706 A1 | 7/2006 | Iyer et al. | |
| 2006/0174048 A1 | 8/2006 | Ohara et al. | |
| 2006/0242352 A1 | 10/2006 | Torudbakken et al. | |
| 2008/0209099 A1 | 8/2008 | Kloeppner et al. | |

(Continued)

FOREIGN PATENT DOCUMENTS

JP    2010-211349 A    9/2010
JP    2011-022877 A    2/2011

(Continued)

*Primary Examiner* — Hiep Nguyen
(74) *Attorney, Agent, or Firm* — Harness, Dickey & Pierce

(57) ABSTRACT

A data transferring method of a storage device is provided. The method may include transferring a first data to a first outbound area, transferring the first data sent to the first outbound area to a first area of a main memory corresponding to a first address programmed by an address translation unit, transferring a second data to a second outbound area in response to an indication that the address translation unit is to be reprogrammed, and transferring the second data sent to the second outbound area to the first outbound area.

13 Claims, 9 Drawing Sheets

(56) References Cited

U.S. PATENT DOCUMENTS

| | | |
|---|---|---|
| 2010/0077117 A1 | 3/2010 | Asnaashari |
| 2010/0162055 A1* | 6/2010 | Morita .................. G06F 11/073 714/704 |
| 2010/0169687 A1* | 7/2010 | Kimura .................. G06F 1/3221 713/324 |
| 2010/0251009 A1 | 9/2010 | Stenfort |
| 2011/0022818 A1 | 1/2011 | Kegel et al. |
| 2011/0276777 A1 | 11/2011 | Cho et al. |
| 2011/0320653 A1 | 12/2011 | Lais et al. |
| 2011/0320675 A1 | 12/2011 | Gregg et al. |
| 2012/0005451 A1 | 1/2012 | Lee et al. |
| 2013/0067146 A1* | 3/2013 | Zettsu ....................... G06F 1/30 711/103 |
| 2013/0067147 A1* | 3/2013 | Okita .................. G06F 12/0246 711/103 |
| 2013/0080716 A1* | 3/2013 | Tamura ............... G06F 12/0246 711/154 |
| 2014/0237170 A1* | 8/2014 | Okita .................. G06F 12/0246 711/103 |

FOREIGN PATENT DOCUMENTS

| | | |
|---|---|---|
| JP | 2011-076174 A | 4/2011 |
| JP | 2011-154609 A | 8/2011 |
| JP | 2011-186658 A | 9/2011 |
| KR | 2012-0010698 A | 2/2012 |
| KR | 2012-0023622 A | 3/2012 |
| KR | 10-1162679 B1 | 7/2012 |

* cited by examiner

Fig. 6

DMA Descriptor

| Add. | Descriptions | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | D31 | D30 | D29 | D28 | D27 | D26 | D25 | D24 | D23 | D22 | D21 | D20 | D19 | D18 | D17 | D16 | D15 | D14 | D13 | D12 | D11 | D10 | D09 | D08 | D07 | D06 | D05 | D04 | D03 | D02 | D01 | D00 |
| 0000 | Should be zero | | | Page Size | Bit MapEn | Should be zero | E2E_En | Should be zero | BitMap[15:0] | | | | | | | | NextDmaDescIdx[7:0] | | | | | | | | | | | | | | | |
| 0004 | Full Address[15:10] | | | | | | Full Address[31:16] | | | | | | | | | | Should be zero | | | | | | | | | | | | | | | |

Fig. 7

Split DMA Descriptor Type A

| Add. | Descriptions | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | D31 | D30 | D29 | D28 | D27 | D26 | D25 | D24 | D23 | D22 | D21 | D20 | D19 | D18 | D17 | D16 | D15 | D14 | D13 | D12 | D11 | D10 | D09 | D08 | D07 | D06 | D05 | D04 | D03 | D02 | D01 | D00 |
| 0000 | 0 | Should be zero | | | Done | Valid | | | | | | | | | | | | | | | Should be zero | | | | | | | | | | | |
| 0004 | Upper target register[31:16] | | | | | | | | | | | | | | | | Upper target register[15:0] | | | | | | | | | | | | | | | |
| 0008 | Lower target register[31:16] | | | | | | | | | | | | | | | | Lower target register[15:0] | | | | | | | | | | | | | | | |
| 000C | Should be zero | | | | | | | | | | | | | | | | Should be zero | | | | | | | | | | | | | | | |

Fig. 8

Split DMA Descriptor Type B

| Add. | Descriptions | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | D31 | D30 | D29 | D28 | D27 | D26 | D25 | D24 | D23 | D22 | D21 | D20 | D19 | D18 | D17 | D16 |
| | D15 | D14 | D13 | D12 | D11 | D10 | D09 | D08 | D07 | D06 | D05 | D04 | D03 | D02 | D01 | D00 |
| 0000 | 0 | Page Size | E2E_En | Error | Done | Valid | Last in a Dma Desc | Last in a TR Desc | DmaDescIdx[7:0] | | | | | | | |
| | LBA[15:0] (this field is valid only if this HDMA Desc is the first) | | | | | | | | | | | | | | | |
| 0004 | SrcAddr[31:16] | | | | | | | | | | | | | | | |
| | SrcAddr[15:0] | | | | | | | | | | | | | | | |
| 0008 | DstAddr[31:16] | | | | | | | | | | | | | | | |
| | DstAddr[15:0] | | | | | | | | | | | | | | | |
| 000C | Sector Count[15:0] | | | | | | | | | | | | | | | |
| | XperSize[15:0] | | | | | | | | | | | | | | | |

STORAGE DEVICE AND DATA TRANSFERRING METHOD THEREOF

CROSS-REFERENCE TO RELATED APPLICATIONS

A claim for priority under 35 U.S.C. §119 is made to Korean Patent Application No. 10-2012-0134590 filed Nov. 26, 2012, in the Korean Intellectual Property Office, the entire contents of which are hereby incorporated by reference.

BACKGROUND

The inventive concepts described herein relate to a storage device and/or a data transferring method thereof.

In recent years, solid state drives (SSDs) have been used as a storage device for computing systems. SSDs may employ a nonvolatile memory (e.g., a flash memory) to store data. Compared with a typical hard disk drive, the SSD may be advantageous in terms of endurance, size, power, and so on. SSDs may be divided into a PCI (Peripheral Component Interconnect) SSD and a SATA (Serial Advanced Technology Attachment) SSD according to a communication method with a host.

SUMMARY

Some example embodiments of the inventive concepts relate to a data transferring method of a storage device.

According to an example embodiment, a data transferring method of a storage device may include transferring first data to a first outbound area, transferring the first data sent to the first outbound area to a first area of a main memory corresponding to a first address programmed by an address translation unit, transferring second data to a second outbound area in response to an indication that the address translation unit is to be reprogrammed, and transferring the second data sent to the second outbound area to the first outbound area.

According to another example embodiment of the inventive concepts, a storage device is provided. The storage device may include an external interface circuit that may be configured to transmit and receive data according to a first interface. The external interface circuit may include a first outbound area that may be configured to window a first area of a main memory, a second outbound area that may be configured to window a second area of the main memory, and an address translation unit that may be configured to change addresses of the first and second areas according to a control signal of a direct memory access circuit. The storage device may include a host bus adaptor that may be configured to exchange data with the external interface circuit according to the first interface. The storage device may include an internal interface emulator that may be configured to exchange data with the host bus adaptor according to a second interface. The storage device may include a direct memory access circuit that may be configured to perform a data transfer operation with an external host memory through the first interface. The storage device may include at least one nonvolatile memory device that may be configured to store data. The storage device may include a memory controller that may be configured to control the at least one nonvolatile memory device according to an input/output request that is output from the internal interface emulator.

According to another example embodiment, a method for determining whether a data transfer operation has been completed is provided. The method includes sending a data transfer request to a main memory. The data transfer request may include a data transfer operation to be performed. The method includes sending doorbell information to a storage device, where the doorbell information indicates that the data transfer request has been made, and the storage device stores the doorbell information in a register. The method includes receiving an interrupt from the storage device once the data transfer operation has been completed. The method includes accessing the doorbell information stored in the register in response to receiving the interrupt and determining whether the data transfer operation has been completed based on the doorbell information stored in the register.

With example embodiments of the inventive concepts, a storage device may control an address conversion unit to automatically set an outbound area alternately at data transfer. Thus, it is possible to improve a data transfer speed.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 6 is a diagram schematically illustrating a DMA descriptor format illustrated in FIG. 5;

FIG. 7 is a diagram illustrating a format of a split DMA type A of FIG. 5;

FIG. 8 is a diagram illustrating a format of a split DMA type B of FIG. 5; and

DETAILED DESCRIPTION

Figure 1:
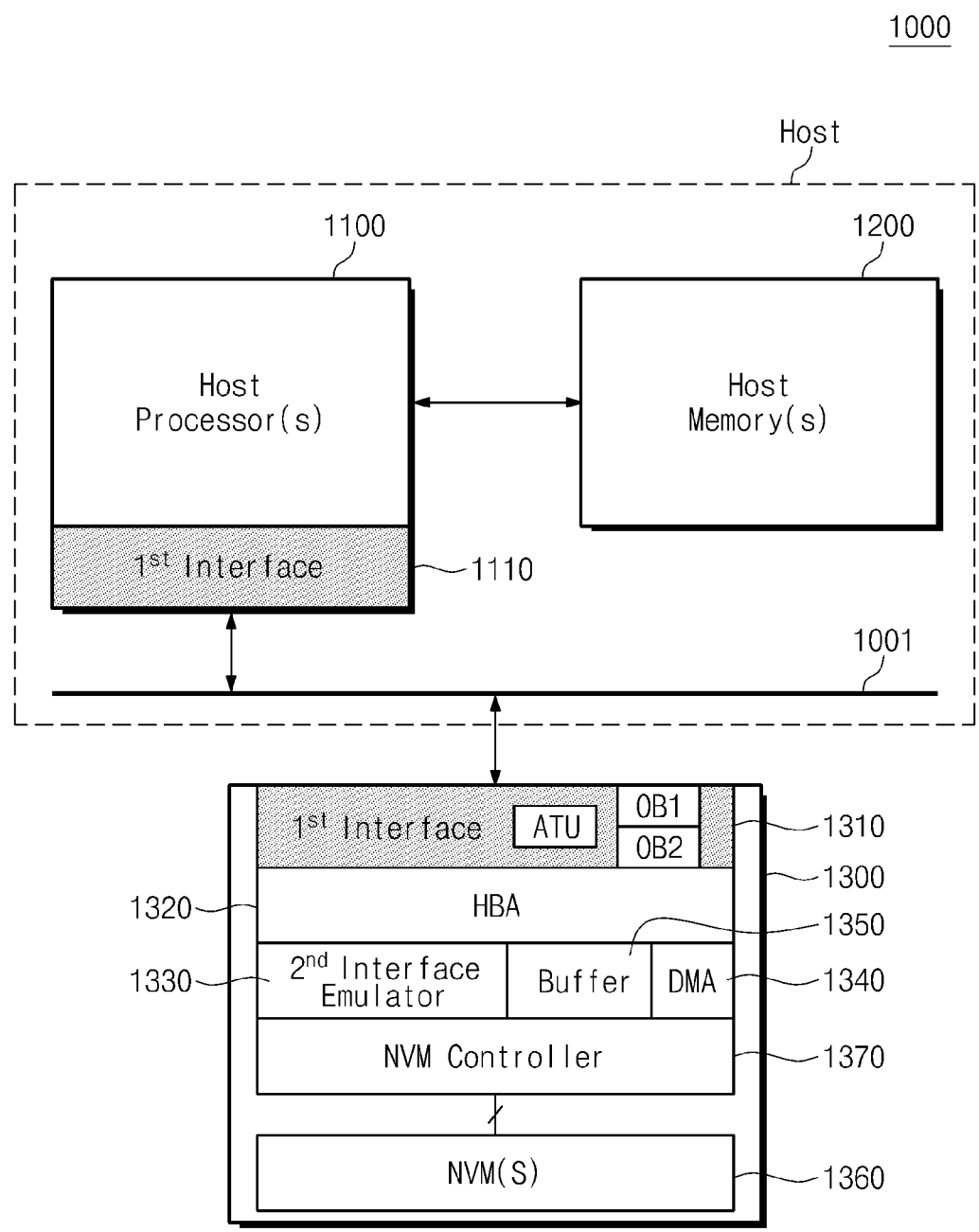
FIG. 1 is a block diagram schematically illustrating a computing system, according to an example embodiment of the inventive concepts.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a computing system according to an embodiment of the inventive concepts. Referring to FIG. 1, a computing system 1000 may include a host bus 1001, at least one host processor 1100, at least one host memory 1200, and a storage device 1300. The components 1001, 1100 and 1200 may be referred to as a host.

The host bus 1001 may transfer data according to a first interface between components (e.g., processor 1100 and the storage device 1300) of the computing system 1000. For example, the first interface may be a FC (Fiber Channel) interface, a USB (Universal Serial Bus) 3.0 interface, a USB 2.0 interface, a SAS (Serial Attached SCSI), a PCIe (Peripheral Component Interconnect express) interface, an SPI (Serial Peripheral interface), a thunderbolt Interface, a lightning bolt interface, or other like interfaces.

The host processor 1100 may control an overall operation of the computing system 1000. The host processor 1100 may include a first interface circuit 1110. The first interface circuit 1110 may be connected with the host bus 1001 according to the first interface. The host processor 1100 may include a memory controller (not shown) configured to control the host memory 1200.

The host memory 1200 may be connected with the host processor 1100, and may store data used during an operation according to a control of the host processor 1100. The host memory 1200 may be implemented using a volatile memory device such as a DRAM, a nonvolatile memory device such as a PRAM, or other like memory device.

The storage device 1300 may be connected with the host bus 1001 according to the first interface, and may store data. According to various embodiments, the storage device 1300 may be configured to communicate with the host via the first interface and perform a data transfer operation internally according to a second interface. For example, the second interface may be an ATA interface, a SATA interface, or other like interface.

The storage device 1300 may include a first interface circuit 1310 (referred to as an external interface circuit), a host bus adaptor 1320, a second interface emulator 1330 (referred to as an internal interface circuit), a DMA circuit 1340, a buffer memory 1350, at least one nonvolatile memory device 1360, and a memory controller 1370.

The first interface circuit 1310 may be connected with the host bus 1001 according to the first interface. The first interface circuit 1310 may include an address translation unit ATU, a first outbound area OB1, and second outbound area OB2.

The address translation unit ATU may support transactions between the first and second outbound areas OB1 and OB2 of the storage device 1300 and an area of the host memory 1200. The address translation unit ATU may be configured to designate an area of the host memory 1200 to correspond to the first and second outbound areas OB1 and OB2, such that the storage device 1300 sees the particular area of the host memory 1200. To read/write data to/from the first and second outbound areas OB1 and OB2, the first and second outbound areas OB1 and OB2 may correspond to read/write data from/ to the designated area of the host memory 1200. In other words, the first and second outbound areas OB1 and OB2 may be a window of the designated area of the host memory 1200. Thus, setting the address translation unit ATU may entail setting an address of the designated area of the host memory 1200 windowed to the first and second outbound areas OB1 and OB2.

The host bus adaptor 1320 may be configured to communicate with the first interface circuit 1310 according to the first interface and with second interface emulator 1330 according to the second interface. The host bus adaptor 1320 may be implemented using software, hardware, or a combination of software and hardware, such that the storage device 1300 understands at least one command output from the host processor 1100. In example embodiments, the host bus adaptor 1320 may be an MCI (Advanced Host Controller Interface) or other like bus adaptor.

Additionally, the first outbound area OB1 and the second outbound area OB2 may each have a variable size, such that the storage device 1300 may change the size of each of the first outbound area OB1 and the second outbound area OB2.

The second interface emulator 1330 may communicate with the host bus adaptor 1320 according to the second interface. The second interface emulator 1330 may be implemented to provide second interface emulation for the storage device 1300. For example, the second interface emulator 1330 may be configured to communicate with the host bus adaptor 1320 using a frame information structure (FIS) of the second interface. The second interface emulator 1330 may be configured to process a FIS transaction to/from the memory controller 1370 or a FIS of the host via the host bus adaptor 1320.

The DMA circuit 1340 may be configured to control the first interface circuit 1310 according to a command input from the host processor 1100, such that the storage device 1300 directly reads/writes data from/to the host memory 1200. According to various embodiments, where reprogramming the address translation unit ATU is required during data transfer, the DMA circuit 1340 may be configured to reprogram the address translation unit ATU to use the second outbound area OB2 without using the first outbound area OB1. That is, when the first outbound area OB1 is being used during a data transfer operation, the second outbound area OB2 may be employed for reprogramming of the address translation unit ATU.

Because the second outbound area OB2 may be used for reprogramming the address translation unit ATU without using the first outbound area OB1, the reprogramming operation may be considered "hidden" from the data transfer operation. Thus, according to various embodiments, the DMA circuit 1340 may be configured to control the address translation unit ATU in order to use the first outbound area OB1 and the second outbound area OB2 to hide a reprogramming time of the address translation unit ATU during a data transfer operation.

The buffer memory 1350 may temporarily store data necessary for an operation of the storage device 1300. For example, the buffer memory 1350 may be implemented by a volatile memory such as a DRAM, an SRAM, or other like memory device.

The at least one nonvolatile memory device 1360 may be configured to store data, and may be at least one of a flash memory (e.g., a NAND flash memory), a phase-change RAM (PRAM), a magnetic RAM (MRAM), a resistive RAM (RRAM), a ferroelectric RAM (FRAM), a vertical NAND (VNAND), or other like data storage device.

The memory controller 1270 may control the at least one nonvolatile memory device 1360 according to a FIS transaction transferred from the second interface emulator 1330. The FIS transaction may be made according to an input/output request or command of the host.

The computing system 1000 according to an example embodiment of the inventive concepts may be configured such that a DMA circuit 1340 performs a data transfer operation and a reprogramming operation of the address translation unit ATU in parallel using the two outbound areas OB1 and OB2. Thus, it is possible to reduce overhead associated with an address translation and/or a loss of data during a data transfer.

Figure 2:
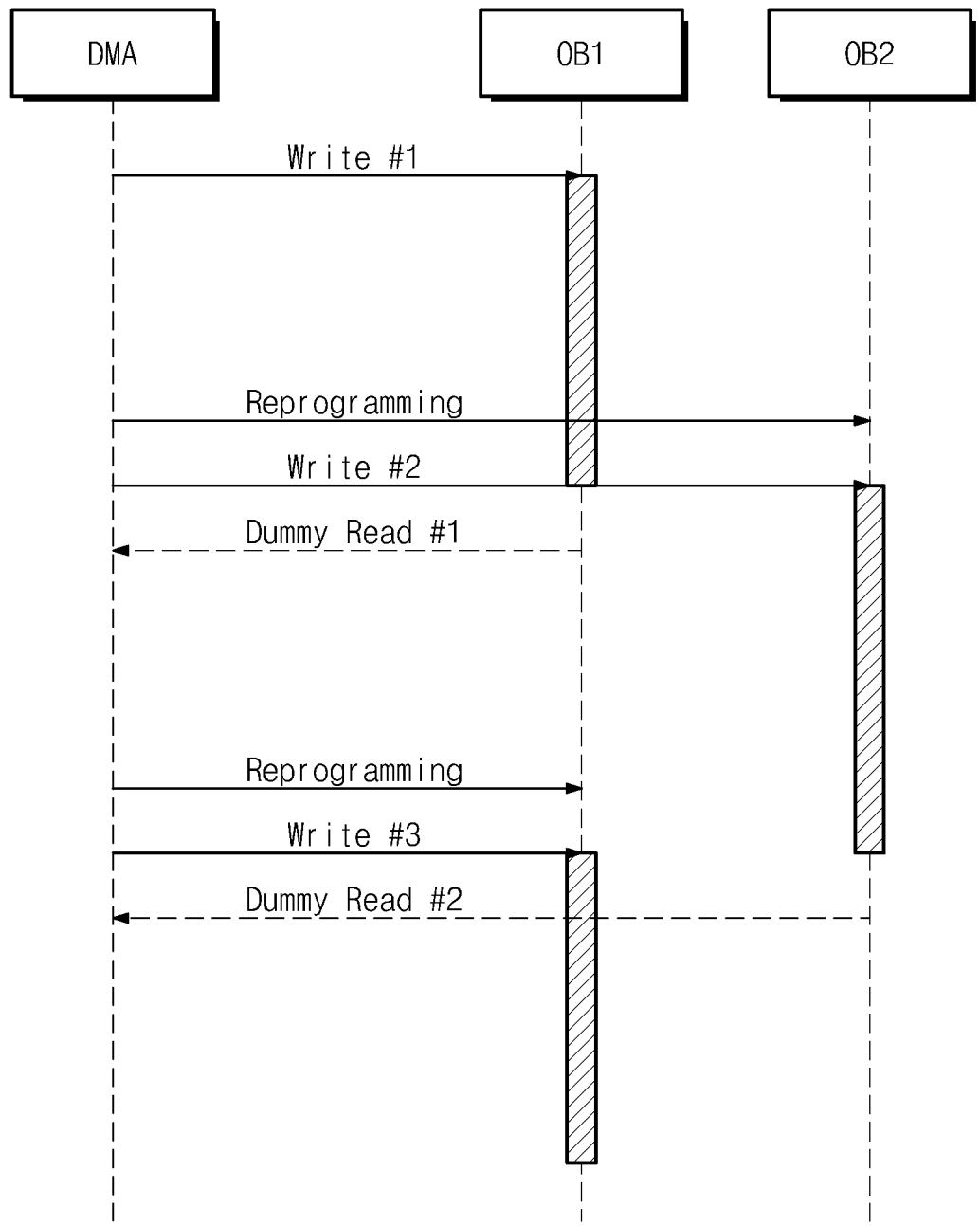
FIG. 2 is a diagram schematically illustrating a data transferring method of a computing system of FIG. 1.

FIG. 2 is a diagram schematically illustrating a data transferring method of a computing system 1000 in FIG. 1. A data transferring method of a computing system 1000 will be more fully described with reference to FIGS. 1 and 2.

A DMA circuit 1340 may transfer first write data to the first outbound area OB1 in response to a first write command Write #1. The first write data transferred to the first outbound area OB1 may be transferred to a first area of a host memory 1200 corresponding to an address set by the address translation unit ATU. When the address translation unit ATU necessitates reprogramming during a transfer of the first write data, second write data may be transferred to the second outbound area OB2 in response to a second write command Write #2. The DMA circuit 1340 may send a signal or other indication that a reprogramming of the address translation unit ATU based on a determined size of the second write data and/or a size of the second area of the host memory 1200. For example, in various embodiments, the address translation unit ATU may be reprogrammed if a size of the write data is determined to exceed at least one of a size of the first outbound area OB1 and a size of the second outbound area OB2.

When a transfer of the first write data in the first outbound area OB1 to an area of the host memory 1200 is completed, the DMA circuit 1340 may request a dummy read operation of the memory location of the host memory 1200 to which the first write data is sent. After the dummy read operation is completed, the DMA circuit 1340 may send the second write data stored at the second outbound area OB2 to the first area of the host memory 1200.

Also, when reprogramming of the address translation unit ATU is required during a transfer of the second write data, a third write data may be sent to the first outbound area OB1 in response to a third write command Write #3.

Although FIG. 2 illustrates a write data transferring operation, the inventive concepts are not limited thereto. For example, a data transferring method of the inventive concepts is applicable to a read data operation.

According to various embodiments, the first outbound area OB1 and the second outbound area OB2 may be alternatively used to transfer data and reprogram of the address translation unit ATU.

According to various embodiments, the first interface may be a PCIe interface and the second interface may be a SATA interface.

Figure 3:
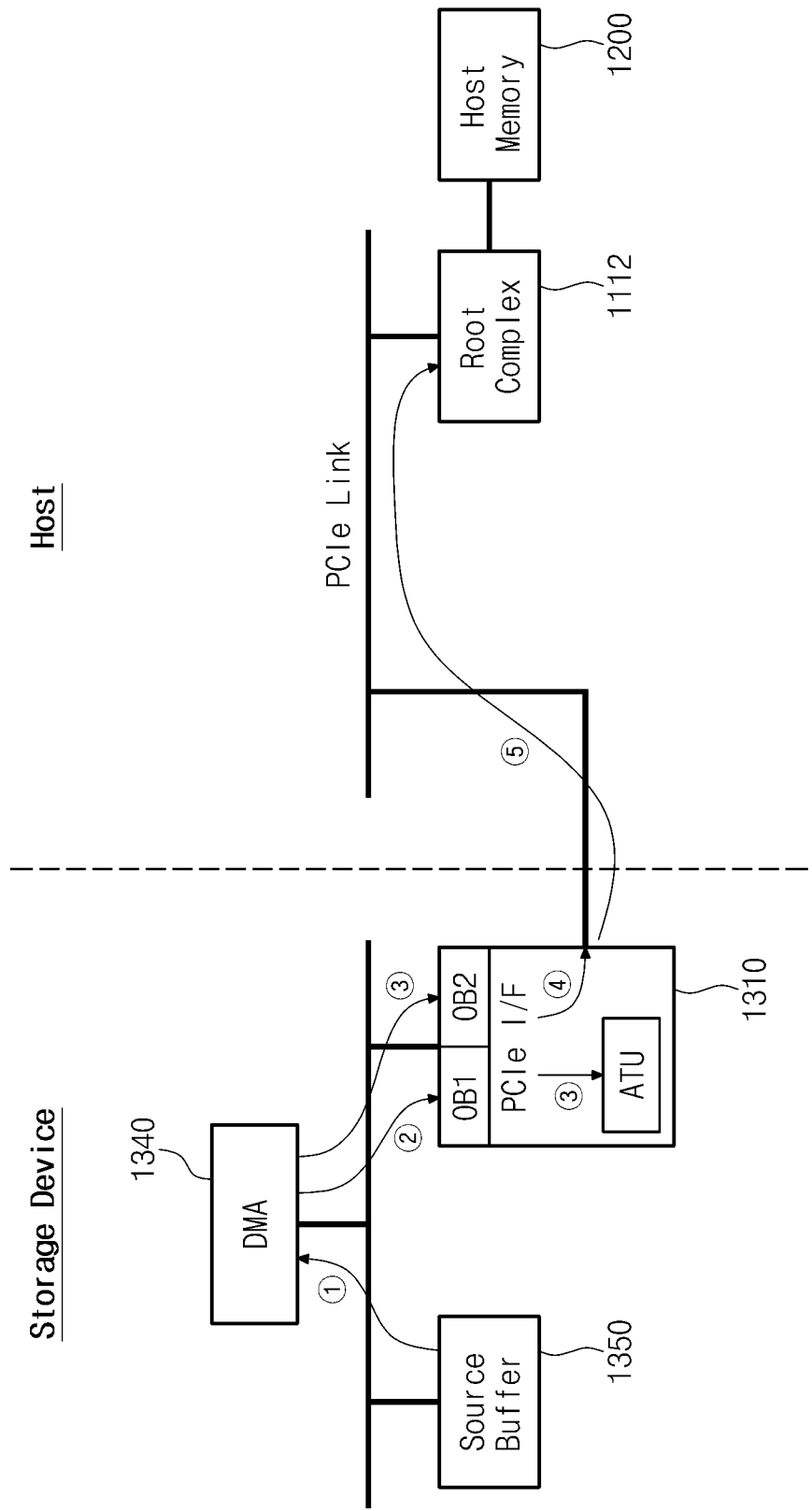
FIG. 3 is a diagram schematically illustrating a DMA data transfer operation using a PCIe interface, according to an example embodiment of the inventive concepts.

FIG. 3 is a diagram schematically illustrating a DMA data transfer operation using a PCIe interface according to an example embodiment of the inventive concepts. Referring to FIG. 3, a DMA circuit 1340 may read/write data from a source buffer (e.g., a buffer memory 1350 of FIG. 1) (①). If reprogramming of an address translation unit ATU during a transfer of read data is not required, the read data may be transferred to a first outbound area OB1 (②). If reprogramming of an address translation unit ATU during a transfer of read data is required, the read data may be transferred to a second outbound area OB2 (③). Data transferred to the first outbound area OB1 and/or data transferred to the second outbound area OB2 may be sent to a root complex 1112 via the address translation unit ATU (④). According to various embodiments, the data transferred to the first outbound area OB1 may be instantly transferred to the root complex 1112. According to various embodiments, the data transferred to the second outbound area OB2 may be sent to the root complex 1112 after a transfer of data to the first outbound area OB1 is completed. Data transferred to the root complex 1112 may be sent to a designated area of the host memory 1200.

The DMA circuit 1340 of the inventive concepts may be configured to determine whether reprogramming of the address translation unit ATU is required, and may be configured to perform a DMA data transfer operation using the first outbound area OB1 and the second outbound area OB2 alternatively according to the determination result.

Figure 4:
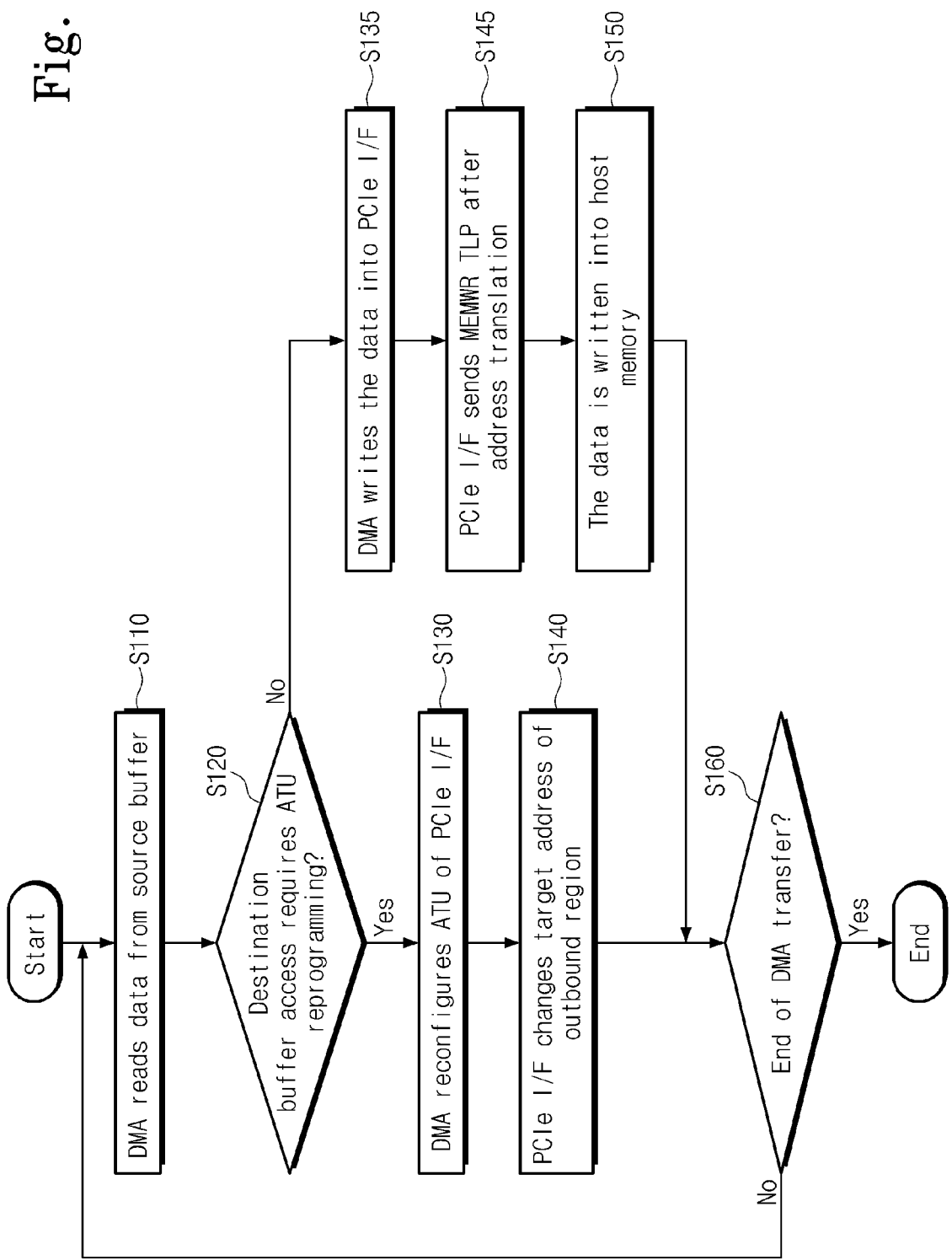
FIG. 4 is a flow chart schematically illustrating a DMA data transferring method of a computing system, according to an example embodiment of the inventive concepts.

FIG. 4 is a flow chart schematically illustrating a DMA data transferring method of a computing system 1000 according to an example embodiment of the inventive concepts. The DMA data transferring method of a computing system 1000 according to an example embodiment of the inventive concepts will be more fully described with reference to FIGS. 1 to 4. For ease of description, it is assumed that a first interface is a PCIe interface and a second interface is a SATA interface.

In operation S110, a DMA circuit 1340 reads data to be transferred from a source buffer 1350. In operation S120, the DMA circuit 1340 determines whether a destination buffer access (e.g., a host memory 1200) requires reprogramming of an address translation unit ATU. If so, in operation S130, the DMA circuit 1340 reprograms the address translation unit ATU of the PCIe interface circuit 1310. In operation S140, the PCIe interface circuit 1310 changes a target address (e.g., an address indicating a designated area of a main memory) of an outbound area OB1 or outbound area OB2. The method then proceeds to operation S160, where the DMA circuit 1340 determines if the DMA transfer has ended. If so, the method ends. If not, the DMA circuit 1340 proceeds to operation S110 to read data to be transferred from a source buffer 1350.

Referring back to operation S120, if the destination buffer access does not require reprogramming of the address translation unit ATU, in operation S135, the read data may be written at an outbound area of the PCIe interface circuit 1310. In operation S145, the PCIe interface circuit 1310 sends a memory write header information MEMWR TLP according to the PCIe interface specification after an address translation. In operation S150, data sent to the outbound area may be written at a particular area of the host memory 1200. In operation S160, the DMA circuit 1340 determines whether a DMA data transfer operation has ended. If so, the method ends. If not, the DMA circuit 1340 proceeds to operation S110 to read data to be transferred from a source buffer 1350.

According to various embodiments, the DMA circuit 1340 may reprogram the address translation unit ATU according to a size of the data to be transferred. For example, according to various embodiments, the address translation unit ATU may be reprogrammed if the size of the data to be transferred exceeds a size of at least one of the first outbound area and the second outbound area. By way of another example, according to various embodiments, when a size of data to be transferred exceeds a size of the first outbound area OB1, the DMA circuit 1340 may split or otherwise divide the data to be transferred into multiple smaller sized pieces of data. In such embodiments, the DMA circuit 1340 may split or otherwise divide the data into a size that corresponds to a size of the first outbound area OB1. In such embodiments, the DMA circuit 1340 may be configured to control the address translation unit ATU, such that the divided or split data is sent to the main memory using the first outbound area OB1 and second outbound area OB2, sequentially.

Figure 5:
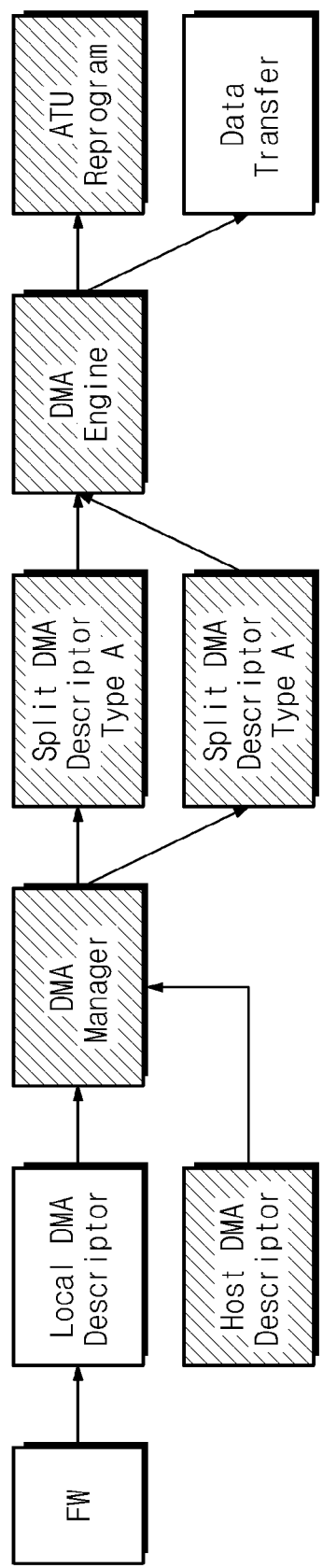
FIG. 5 is a diagram schematically illustrating a DMA structure, according to an example embodiment of the inventive concepts.

FIG. 5 is a diagram schematically illustrating a DMA structure according to an example embodiment of the inventive concepts. Referring to FIG. 5, firmware FW may output a local DMA descriptor. The local DMA descriptor may be information associated with source data. A DMA manager may split or otherwise divide the local DMA descriptor into a DMA type and a host descriptor. The host descriptor may be information associated with a main memory. A split DMA descriptor type A may include information associated with reprogramming of an address translation unit ATU, and a split DMA descriptor type B may include information associated with a data transfer of the main memory. A DMA engine may receive the split DMA descriptor type A and the split DMA descriptor type B, and may reprogram the address translation unit ATU or control a PCIe interface circuit 1310 to transfer data.

The DMA circuit 1340 according to an example embodiment of the inventive concepts may alternate the split DMA descriptors A and B, and may perform a DMA data transfer operation or ATU reprogramming.

FIG. 6 is a diagram schematically illustrating a DMA descriptor format illustrated in FIG. 5.

FIG. 7 is a diagram illustrating a format of a split DMA type A of FIG. 5. Referring to FIG. 7, a type A of split DMA descriptor may be used to reprogram a target address of an ATU.

FIG. 8 is a diagram illustrating a format of a split DMA type B of FIG. 5. Referring to FIG. 8, a type B of split DMA descriptor may be used to transfer data.

Figure 9:
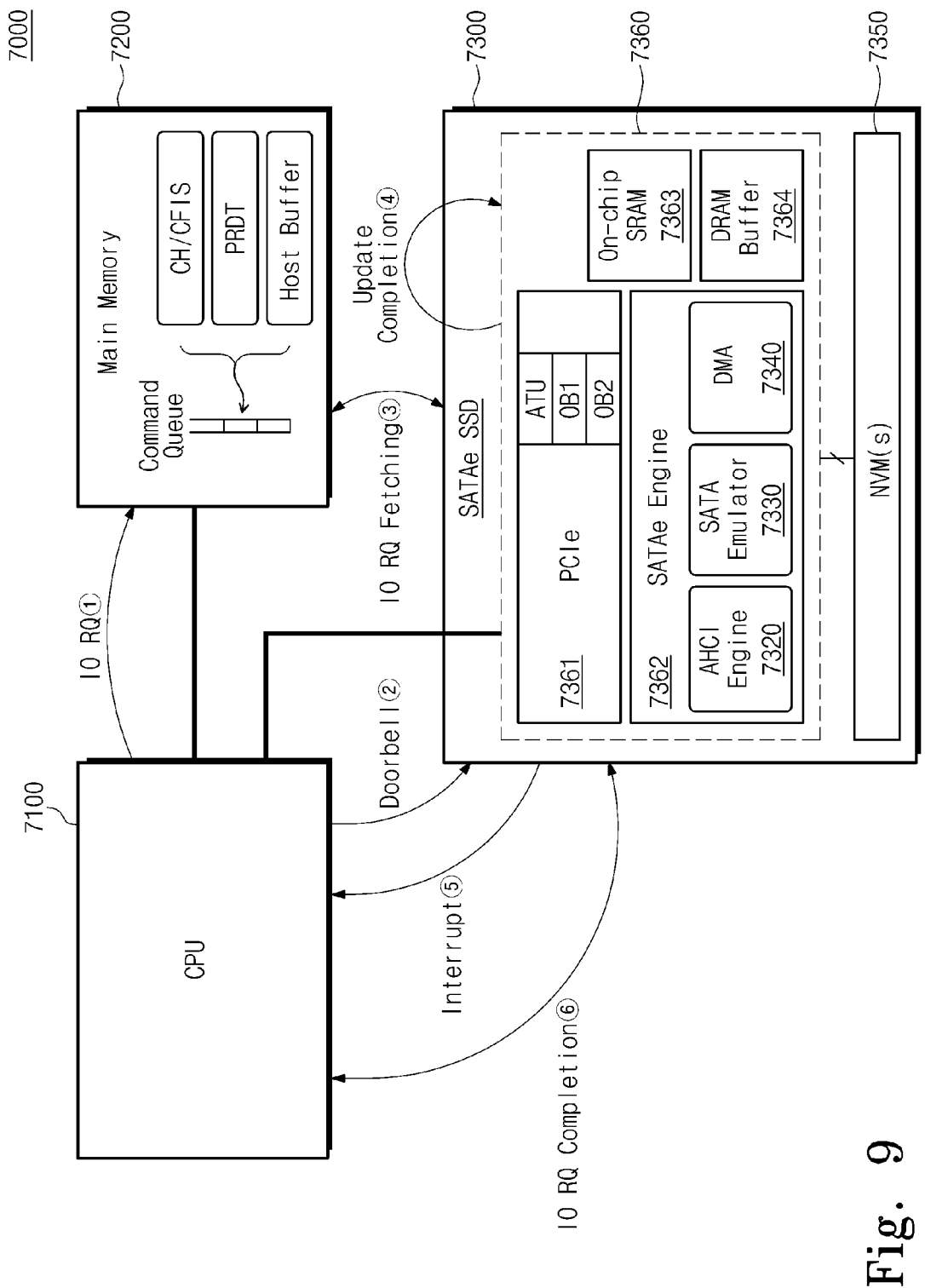
FIG. 9 is a diagram schematically illustrating a computing system, according to an example embodiment of the inventive concepts.

FIG. 9 is a diagram schematically illustrating a computing system according to an example embodiment of the inventive concepts. Referring to FIG. 9, a computing system 7000 may include a CPU 7100, a main memory 7200, and a SATAe storage device 7300. The SATAe storage device 7300 may include a nonvolatile memory device 7350 and a SATA controller 7360 controlling the nonvolatile memory device 7350. The SATA controller 7360 may include a PCIe interface circuit 7361, a SATAe engine 7362, an on-chip SRAM 7363 and a DRAM buffer 7364. The SATAe engine 7362 may include an MCI engine 7320, a SATA emulator 7330, and a DMA circuit 7340. The PCIe interface circuit 7361 may include an address translation unit ATU, a first outbound area OB1, and a second outbound area OB2. The DMA circuit 7340 of the inventive concepts may be configured to control the address translation unit ATU and the first and second outbound areas OB1 and OB2 in order to perform a DMA data transfer operation and a reprogramming of the address translation unit ATU in parallel. In various embodiments, the DMA circuit 7340 may be configured to control the address translation unit ATU to use the first outbound area OB1 and the second outbound area OB2 to hide a reprogramming time of the address translation unit during a data transfer operation.

An input/output request IO RQ may be made as follows.

If the input/output request IO RQ is available, the CPU 7100 sends the input/output request IO RQ to the main memory 7200 (①). A command queue corresponding to the input/output request IO RQ may include a command header/ command FIS, a physical region descriptor table PRDT, a host buffer, and other like data. A physical region descriptor PRD may be a structure directing a memory area where data to be transferred to a host or data transferred from the host is stored. The physical region descriptor PRD may include a size and an address of a corresponding memory area.

The CPU 7100 provides the SATAe storage device 7300 with doorbell information indicating that the input/output request IO RQ is made (②). The MCI engine 7320 of the SATAe storage device 7300 may include a host register (e.g., PxCI) to store the doorbell information. The SATAe storage device 7300 fetches the input/output request IO RQ (e.g., a command header, a command FIS, and a physical region descriptor table) (③). At this time, a host register (e.g., PxCI, PxSACT, PxTFD) corresponding to the input/output request IO RQ is automatically updated (④). The DMA circuit 7340 may exchange data with a designated area of the SATAe storage device 7300 according to the input/output request IO RQ. When a data transfer operation is completed, the SATAe storage device 7300 sends an interrupt to the CPU 7100 (⑤). Based on the interrupt, the CPU 7100 checks the host register (e.g., PxCI, PxSACT, PxTFD, etc.) of the SATAe storage device 7300 to check information indicating that the input/ output request IO RQ is completed (⑥).

While the inventive concepts has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A data transferring method of a storage device, the method comprising:
   transferring, by the storage device, first data to a first outbound area;
   transferring, by the storage device, the first data transferred to the first outbound area to a first area of a main memory, the first area of the main memory corresponding to a first address programmed by an address translation unit;
   transferring, by the storage device, second data to a second outbound area; and transferring, by the storage device, the second data from the second outbound area to a second area of the main memory corresponding to a second address reprogrammed by the address translation unit.

2. The data transferring method of claim 1, wherein both the first data and the second data are read data, the read data being read from a source buffer through a direct memory access circuit in response to a read command.

3. The data transferring method of claim 2, further comprising:
   determining, by the direct memory access circuit, whether a size of the read data exceeds a size of the first outbound area; and
   reprograming, by the direct memory access circuit, the address translation unit for a transfer of the second data when a size of the read data exceeds a size of the first outbound area.

4. The data transferring method of claim 3, further comprising:
   programming the address translation unit such that an area of the main memory corresponding to the first address is designated as the first outbound area before the first data is transferred to the first outbound area.

5. The data transferring method of claim 3, further comprising:
   reprogramming the address translation unit such that an area of the main memory corresponding to the second address is designated as the second outbound after the first data is transferred to the first area of the main memory.

6. The data transferring method of claim 5, further comprising:
   performing a dummy read operation on the first outbound area through the direct memory access circuit; and
   determining whether a transfer of the first data has been completed.

7. The data transferring method of claim 1, wherein each of the first data and the second data is read data, the read data being read from a source buffer through a direct memory access circuit according to a read command.

8. The data transferring method of claim 7, further comprising:
   performing a dummy read operation on the first outbound area through the direct memory access circuit;
   determining whether a transfer of the first data has been completed;
   performing a dummy read operation on the second outbound area through the direct memory access circuit; and
   determining whether a transfer of the second data has been completed.

9. A method for determining whether a data transfer operation has been completed, the method comprising:
   sending, by a processor, a data transfer request to a main memory, the data transfer request including a data transfer operation to be performed;
   sending, by the processor, doorbell information to a storage device, the doorbell information indicating that the data transfer request has been made, the storage device storing the doorbell information in a register;
   receiving, by the processor, an interrupt from the storage device once the data transfer operation has been completed;
   accessing, by the processor, the doorbell information stored in the register in response to receiving the interrupt; and
   determining, by the processor, whether the data transfer operation has been completed based on the doorbell information stored in the register.

10. The method of claim 9, wherein in response to the data transfer request being sent, the storage device fetches a command that corresponds to the data transfer request and the storage device updates the register with the doorbell information.

11. The method of claim 9, wherein the storage device includes an interface circuit including an address translation unit, a first outbound area, and a second outbound area, and the method further comprises:
    directing the storage device to transfer first write data from the first outbound area if the data transfer operation is a write operation;
    determining whether the address translation unit requires reprogramming; and
    directing the storage device to transfer second write data from the second outbound area if the address translation unit is determined to require reprogramming.

12. The method of claim 11, wherein the determining whether the address translation unit requires reprogramming comprises:
    determining a size of the first outbound area;
    determining a size of the first write data; and
    determining that the address translation unit requires reprogramming if the size of the first write data is greater than the size of the first outbound area.

13. The method of claim 12, further comprising:
    reprogramming the address translation unit in parallel with the data transfer operation.

* * * * *